United States Patent [19]

dePuglia et al.

[11] Patent Number: 4,560,138
[45] Date of Patent: Dec. 24, 1985

[54] ENCAPSULATION MOLD

[76] Inventors: Gaston D. dePuglia, 13 Seascape Ct., Brookings, Oreg. 97415; William J. Van der Borght, 8348 Riesling Way, San Jose, Calif. 95135; Max Moitzger, North Spud Island, Stockton, Calif. 95209

[21] Appl. No.: 555,147

[22] Filed: Nov. 25, 1983

[51] Int. Cl.⁴ .......................... B29C 1/00; B29D 3/00
[52] U.S. Cl. .................................... 249/95; 425/116; 425/117
[58] Field of Search ............... 249/85, 91, 95, 83; 425/110, 116, 117, 123, 127, 129 R; 264/272.14, 272.17, 275, 277, 278

[56] References Cited

U.S. PATENT DOCUMENTS

| | | | |
|---|---|---|---|
| 436,388 | 9/1890 | Taylor et al. | 249/95 |
| 531,362 | 12/1894 | Cox | 249/95 |
| 2,415,961 | 2/1947 | Nast | 249/95 |
| 3,074,112 | 1/1963 | Bobrow | 249/83 |
| 3,244,302 | 4/1966 | Best | 249/95 |
| 3,539,675 | 11/1970 | Hugill | 264/272.17 |
| 3,542,328 | 11/1970 | Deitrich | 425/129 R |
| 3,551,956 | 1/1971 | Rosier | 249/95 |
| 3,780,559 | 12/1975 | Turner | 425/129 R |
| 4,332,537 | 6/1982 | Slepcevic | 425/129 R |
| 4,453,903 | 6/1984 | Pukaite | 425/117 |

FOREIGN PATENT DOCUMENTS 0008608 1/1983 Japan .............................. 264/272.17

Primary Examiner—Willard E. Hoag
Attorney, Agent, or Firm—Jack M. Wiseman

[57] ABSTRACT

An encapsulation mold has slanted support walls which accommodate a plurality of units that are to be encapsulated, and a runner system for effectively distributing plastic to chamber adjacent the areas of the units that are to be encapsulated.

16 Claims, 8 Drawing Figures

ENCAPSULATION MOLD

BACKGROUND OF THE INVENTION

This invention relates to molds, and more particularly to encapsulation molds in which plastic material is directed to chambers in the mold and solidified to cover certain areas of articles held between the sections of the mold.

Standard encapsulation molds are usually constructed with top and bottom halves that are parted with the opening of the press. All of the mold cavity area is built into the mold sections so that nothing is removed at the end of a molding operation except the finished end product. The product is usually molded in a flat parallel position so that an ejection system is needed to force the molded product from the cavities of both the top and the bottom halves of the mold. Further, means must be provided for accurately aligning the two mold sections as they are brought together. In the mold of the present invention no product ejection system is needed, and the halves are so designed that they have the inherent ability to align themselves and the article disposed between them as they close. Also, the mold is easy to load and easy to clean after a molding operation.

SUMMARY OF THE INVENTION

A mold has a lower section with a plurality of slanted walls that define upwardly-opening generally V-shaped recesses and provide inclined support surfaces for articles that have areas to be encapsulated. An upper mold section has downwardly-directed walls that have lower ends which cooperate with the walls of the lower section to define runners, and slanted side walls that cooperate with the inclined walls of the lower section to hold in place a unit which consists of an article to be encapsulated disposed between two cavity plates. An inlet passage in the upper section directs molten material to the runners which guide it into chambers surrounding the areas to be encapsulated.

DESCRIPTION OF A PREFERRED EMBODIMENT

Figures 1, 2, 3:
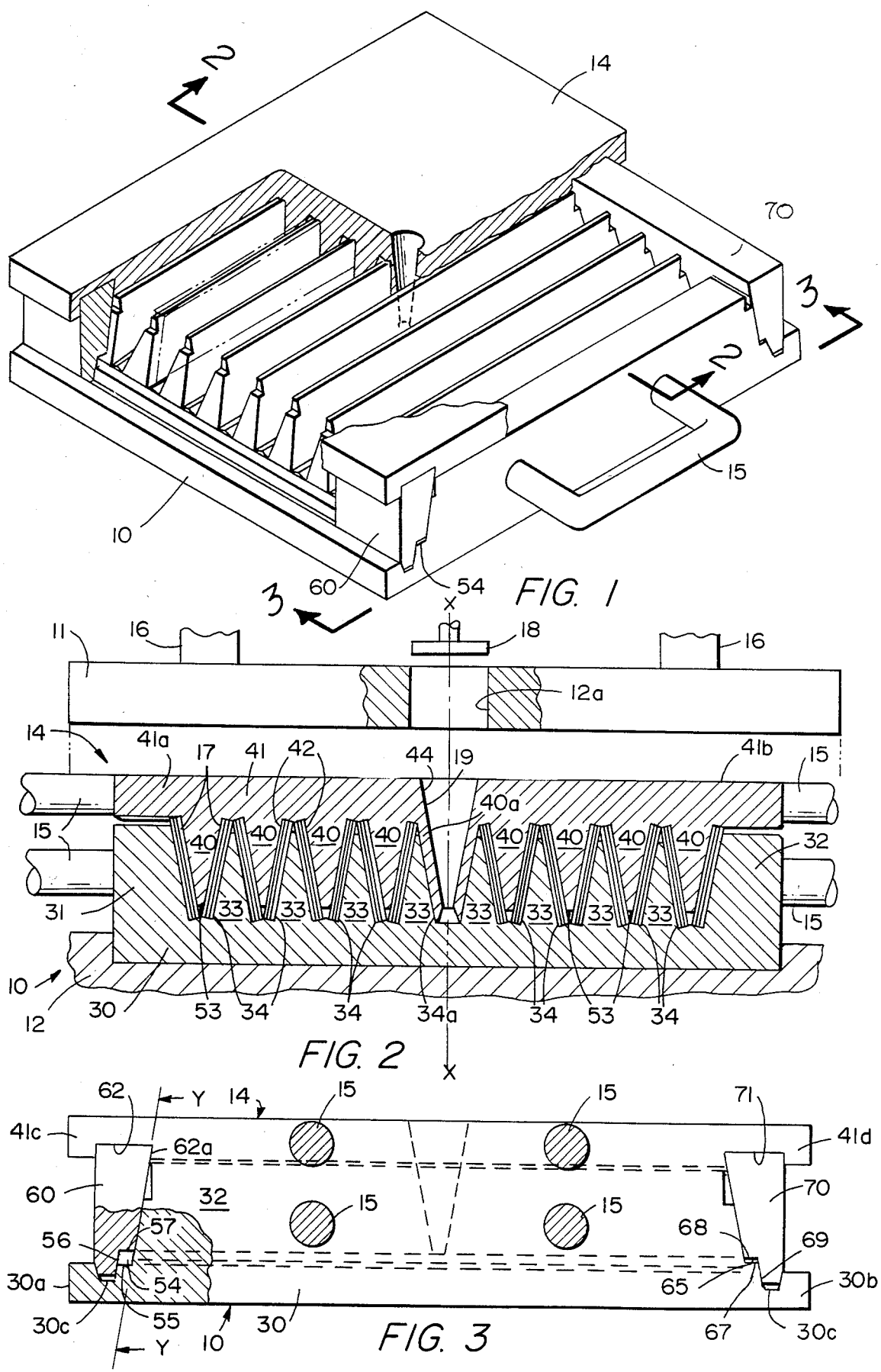
FIG. 1 is a diagrammatic perspective of the mold of the present invention shown separated from a press.
FIG. 2 is a diagrammatic section taken along line 2—2 of FIG. 1.
FIG. 3 is a diagrammatic section taken along lines 3—3 of FIG. 1.

The transfer mold of the present invention includes a lower section 10 which is adapted to be removably positioned in an upwardly-opening recess in a heated lower platen 12 (FIG. 2) that is adapted to be bolted to an upwardly-movable base member (not shown) of a hydraulic press, such as the Model 125 HTMP-1000 press marketed by J. Sprout and Company. An upper heated platen 11, that is secured by means of a bridge structure 16 to a stationary upper press member (not shown) is provided with a central transfer chamber 12a. A piston tip 18, which has an upper end connected to the lower end of a piston (not shown) that is slidably journalled in the upper press member is arranged to be moved down into the transfer chamber 12a.

An upper mold section 14 is movable downwardly into engagement with the lower section 10 to close the mold before the mold is placed in the press and to accurately position certain operative parts of the two sections relative to each other. Each of the mold sections is provided with a handle 15 at opposite sides of the section and, at the beginning of a molding operation, the upper section 14 is separated from the lower section, and both sections are placed on a suitable support, such as a flat heated table top. As will be described fully hereinafter, a plurality of assemblies, each of which includes a strip carrying a plurality of electronic devices that are to receive a plurality of protective encapsulations are then positioned against slanted walls of the lower section, and the upper mold section is brought down onto the lower section to lock the assemblies 17 in place between the sections. The two mold sections are then lifted as a unit and positioned in the recess in the lower press platen 12. The lower press member is then moved upwardly to bring the upper mold section into engagement with the stationary upper platen to clamp the mold sections between the two platens with a pressure of approximately twenty-five tons. A predetermined quantity of preheated plastic pellets is deposited in the transfer chamber 12a in the top platen and some of the pellets drop into a funnel-shaped sprue hole 19 in the upper mold section 14. Within a few seconds, the transfer piston 18 is moved downward to apply a pressure of about 1000 psi to the pellets, forcing the plastic into and through the flow passages formed between the mold sections. The mold is maintained in closed position for a short period such as two minutes to allow the plastic to set up under heat and pressure.

The lower mold section 10 (FIGS. 2, 4 and 6) is essentially a one-piece block-like member including a bottom wall 30, two upstanding end walls 31 and 32 (FIG. 2), and a plurality of intermediate upwardly-projecting walls 33 that cooperate with each other and with the end walls to define V-shaped parallel grooves or recesses 34 which are disposed in equi-spaced relation between the end walls 31 and 32. Each recess 34 is defined by a generally flat bottom surface 35 (FIG. 6) and two oppositely inclined side wall surfaces 36 which extend upwardly from the bottom surface 35. Certain ones of the side wall surfaces 36 of adjacent recesses incline toward each other and are joined at their uppermost ends by a flat surface 37. In the FIG. 2 embodiment, there are eight V-shaped recesses, two on each side of a central recess, identified as recess 34a, and it is to be noted that the bottom surface 35 of each of these eight recesses is formed by two relatively flat sections that are slightly inclined upwardly and inwardly to a central longitudinal junction line to form two oppositely inclined support surfaces 35a and 35b (FIG. 6), whereas the bottom surface 35 of the central recess is completely flat.

The walls 33 are coextensive in length with each other and with the end walls 31 and 32 and, as seen in FIG. 3, the end surfaces of the walls are in planes Y—Y that incline upwardly and inwardly relative to the bottom wall 30. The bottom wall has portions 30a and 30b at opposite ends that extend outwardly a short distance past the adjacent inclined end surfaces of the end walls 31 and 32 and of the intermediate walls 33, and a groove 30c is formed in each of these end portions.

The upper mold section 14 is also a block-like member having a plurality of spaced projections or walls 40 (FIG. 2) which project downwardly from a generally rectangular top support surface 41 and have inclined side wall surfaces which define a plurality of parallel grooves 42. Four depending walls 40 are disposed on each side of a central wall, identified as 40a, which is substantially identical to the other walls but has the fructoconical sprue hole 19 extending downwardly therethrough at a point intermediate its length.

When the upper mold section 14 is positioned on the lower mold section, laterally projecting end sections 41a and 41b on two opposite edges of the top plate 41 overlie the end walls 31 and 32, and laterally projecting end sections 41c and 41d (FIG. 3) overlie the end sections 30a and 30b of the lower mold. In this position the grooves 34 of the lower section receive the depending walls 40 of the upper section, and the grooves 42 in the upper section receive the walls 33 of the lower mold section. When the mold sections are positioned in this manner with the walls 40 and 33 in interdigitating relation, and with the sections aligned with each other each of the inclined side surfaces of the walls 40 of the upper mold section is disposed in parallel spaced relation to an inclined wall surface of one of the upwardly-projecting walls 33 of the lower mold section. To achieve this relationship of the walls, each of the walls is formed symmetrical relative to a vertical reference plane running longitudinally through the center of the wall, with each of said reference planes being parallel to a vertical plane X—X (FIG. 2) extending longitudinal through the central wall 40a of the upper mold section and through the center groove 34a of the lower mold section. In preferred embodiment, the surfaces of the walls are inclined about 10 degrees relative to plane X—X.

Figures 4, 5:
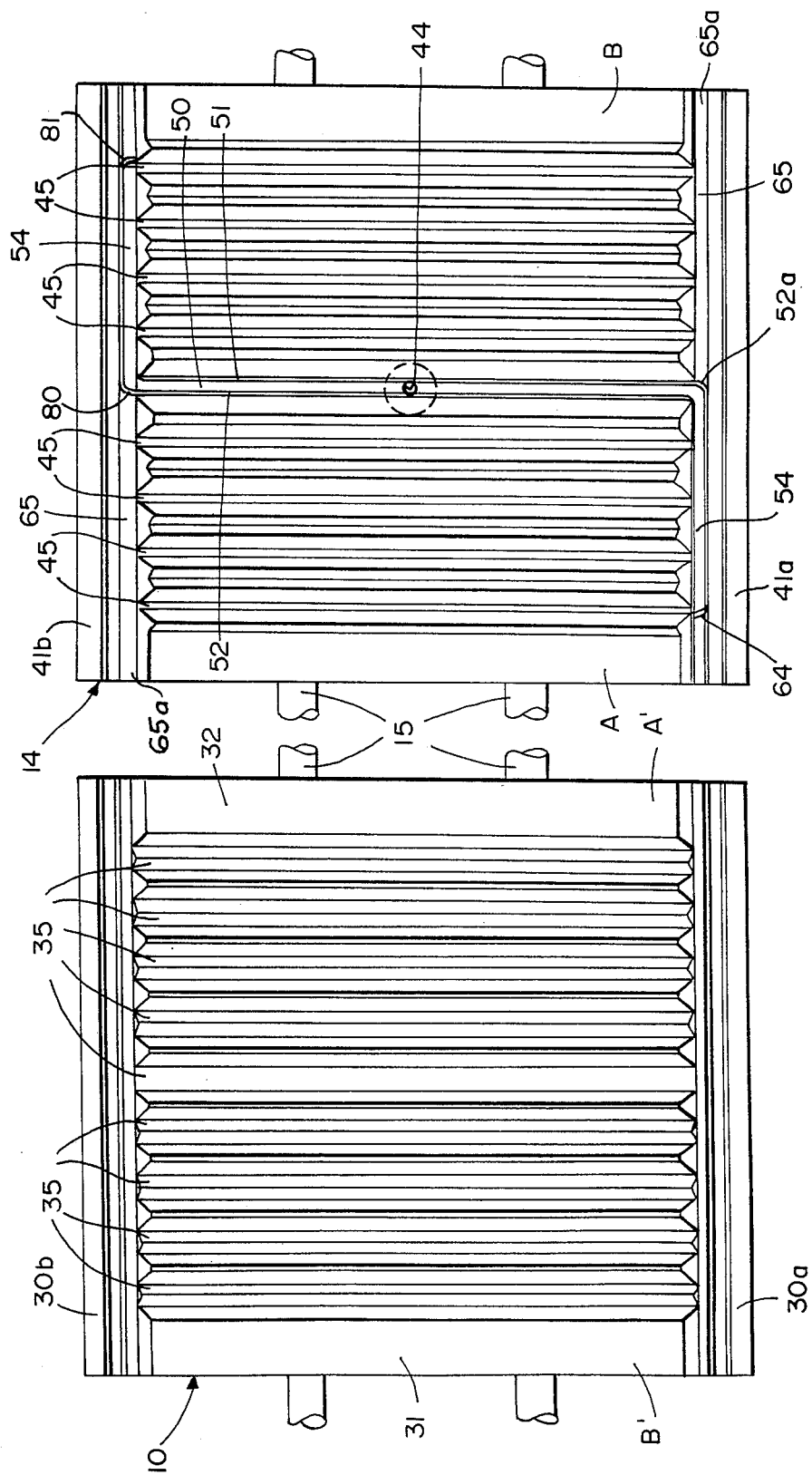
FIG. 4 is a fragmentary diagrammatic plan of the lower mold section of FIG. 1.
FIG. 5 is a fragmentary diagrammatic plan looking at the underside of the upper mold section of FIG. 1.
Figure 6:
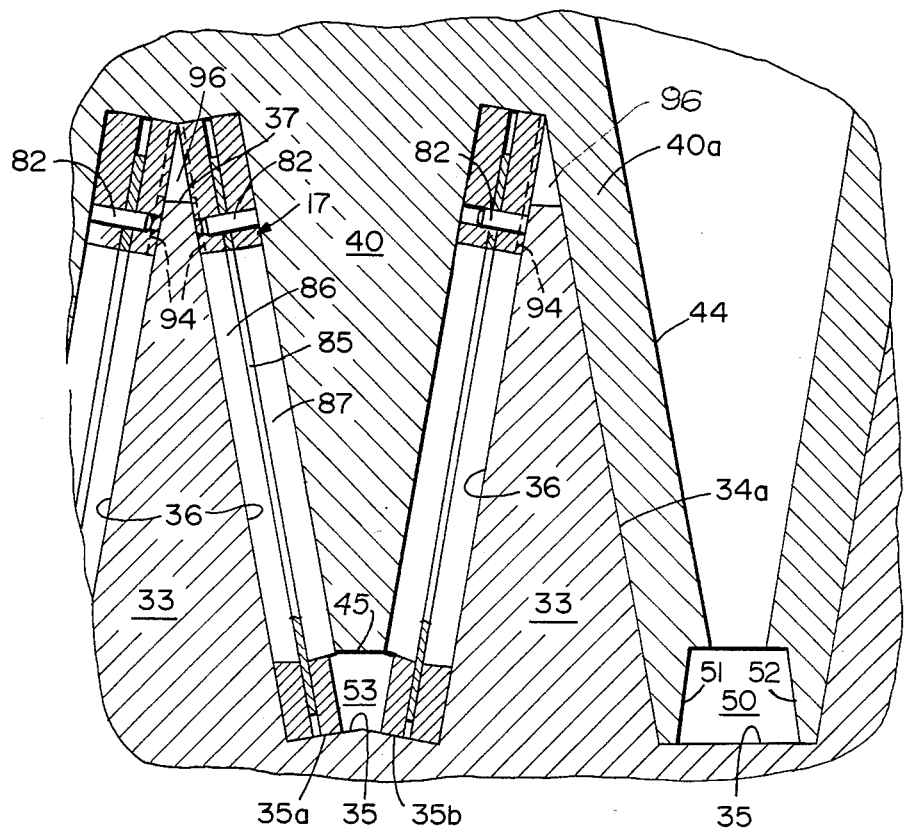
FIG. 6 is an enlarged view of a portion of FIG. 2.

It will be noted in FIG. 6 that the lower end of the sprue hole 19 communicates with a flow channel or runner 50 which is defined by spaced walls 51 and 52 formed at the lower end of the central wall 40a and the opposed flat bottom surface 35 of the central groove 34a in the lower mold section. Runner 50 extends across the mold, as shown in FIG. 5, parallel to runners 53 FIGS. 2 and 6) which are formed, when the mold is closed, by the lower surface 45 of each depending wall 40, the opposed bottom wall 35 of a groove in the lower mold section, and side surfaces at the lower ends of two of the units 17 which have been positioned in the mold for processing.

At one end of runner 50, the wall 52 is provided with a curved extension 52a (FIG. 5) that extends to a transverse runner 54 (FIG. 3) which is formed by laterally-extending surfaces at one end of the interdigitated walls 31, 32, 33 and 40 of the mold sections, a flat upwardly-facing surface 55 of the bottom wall extension 30a, and walls 56 and 57 provided by a recess in an end wedge bar 60. At its lower end the bar 60 is tapered so that it can be moved downwardly into tight engagement with the inwardly slanted walls of the groove 30c in the base extension 30a. The upper end of the bar 60 is disposed in a socket 62 in the top plate 41 of the upper mold section with one face of the bar in engagement with a slanted wall 62a of the socket. A curved wall 64 (FIG. 5) near one end of runner 54 closes that end of the runner and directs the flowing plastic into one of the runners 53.

FIG. 5 is a plan view looking upwardly into the upper mold section, and it is so oriented alongside FIG. 4 that, if it were to be moved from the FIG. 5 position to a mold-closing position over the lower mold section 10 of FIG. 4, it would be folded over onto section 10, bringing a side margin A of section 14 into overlying relation with side margin A' of section 10 and bringing margin B of section 14 into overlying relation with margin B' of section 10. This would bring the curved wall 64 close to the margins A—A' and, accordingly, plastic that is directed into the longitudinal runners 53 will flow lengthwise of the mold into a transverse vent passage 65 (FIG. 3) which is formed at the other end of the mold by the slanted end surfaces of the interdigitated walls 31, 32, 33 and 40 of the mold, a flat upwardly-facing surface 67 of the lower mold extension 30b, and walls 68 and 69 provided by a recess in an end wedge bar 70. Bar 70 is identical to wedge bar 60 but is oppositely disposed in the mold, having an upper end disposed in a socket 71 in the top plate 41 and a lower end in wedge engagement with the inwardly-slanted walls of the groove 30c in base 30. As seen in FIG. 3, an opening of about 0.001–0.0015" is formed at one end 65a of the vent passage 65, and excess plastic flowing out of the longitudinal runners 53 can move into vent passage 65 and flow toward the open vent end.

A curved wall 80 (FIG. 5) is formed at the end of the central longitudinal runner 50 opposite the curved wall 52a to extend to the transverse runner 54 at that end of the mold and direct plastic in a direction away from end 65a and toward a curved wall 81 which guides the plastic into the runner 53 closest to the margins B and B' of the mold. Plastic in runners 53 that are between the central runners 50 and the edges B, B' can flow into the lateral vent passage 65 at the opposite end of the mold, and excess air flowing out of runner 53 can move by way of passage 65 to the restricted opening at the outer end 65a of the passage.

Figure 7:
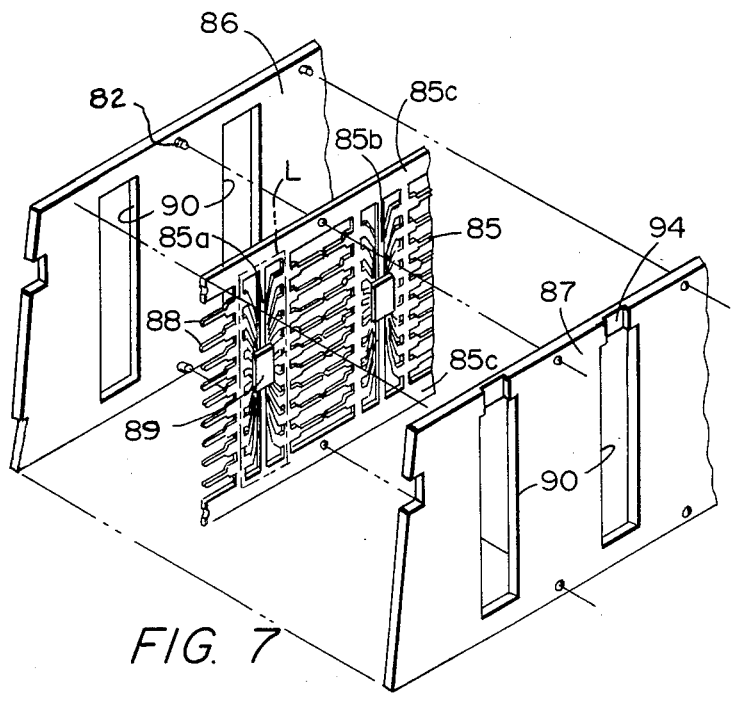
FIG. 7 is an exploded, diagrammatic perspective of a portion of the leadframe strip and the two cavity plates which make up one of the units that is to be subjected to an encapsulation operation.

Each of the assemblies 17 that are positioned for processing in the closed mold includes a central elongate strip 85 (FIGS. 6 and 7) and elongate cavity plates 86 and 87 disposed on opposite sides of the strip in close face-to-face contact therewith as shown in FIG. 6. As seen in FIG. 7 each end of each plate 86 and 87 is slanted at about 10° to the parallel upper end lower margins of the plates, and these slanted edges are in position to be engaged by the slanted walls of the wedge bars 60 and 70. Prior to being placed on one of the inclined surfaces 35a or 35b of the lower mold section, the unit is assembled by engaging locator pins 82 (three only being shown) carried by one of the cavity plates through openings in the upper and lower margins 85c of the strip 85 and in the other cavity plate.

Figure 8:
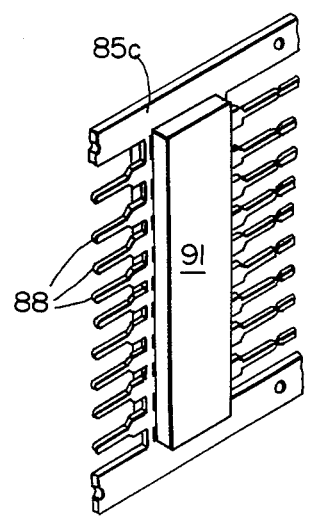
FIG. 8 is a diagrammatic perspective of a portion of the leadframe strip after the encapsulation operation has been completed and the strip has been removed from the mold.

Each strip comprises a plurality of identical interconnected leadframe segments 85a, 85b, et cetera (FIG. 7), each segment including a central base 89 on which a chip (not shown) is to be secured before insertion in the mold and a plurality of leads 88 that extend inwardly from opposite sides of the segment and are connected to the base. Each cavity plate includes a plurality of elongated openings 90, one opening for each leadframe segment. In the assembled condition of the unit 17, the cavity plates mask off all surface areas of the leadframe strip except those areas, indicated generally by phantom lines L of FIG. 7, that are directly opposite the elongate openings 90 in the cavity plates. When plastic is circulated through the mold, it moves into the lower ends of the cavities provided by the openings of the cavity plate, in a manner that will be explained presently, and fills the cavities on each side of the base and the chip thereon and the leads close to the base. As a result, when the mold is opened after a predetermined interval, the base, the chip and the adjacent leads on each side of the leadframe strip are enclosed in a protective covering 91 (FIG. 8) of plastic.

Referring to FIG. 6 it will be noted that the inlet runners 53 are in the lower part of the mold and that, to reach the mold cavities, the plastic must flow upwardly from the runners. In the embodiment of FIG. 6, the total thickness of the assembly 17, including the central strip 85 and the two cavity plates 86 and 87, is made identical to the distance between the wall 36 of each V-shaped groove and the confronting wall 40 of the upper mold section. The arrangement is such that each elongate opening 90 in the cavity plate communicates with the runner 53. Plastic from runner 53 flows through the openings 90 in the cavity plates and between the elements of the leadframe strip, and then upwardly to vent passages 94 provided in the cavity plate 87 which rests against the wall 36. From the passages 94, the trapped air flows into a vent reservoir or manifold 96 formed between the side faces of two cavity plates and the flat surface 37 at the upper end of the adjacent wall 33.

It is to be noted that, at an early stage in the operation, when the mold sections are not in engagement, the units to be processed may be easily positioned against the slanted walls of the lower mold section. Then the upper mold section, with the end wedge bars 60 and 70 in place, is brought down on the lower section and pressure is applied to lock the units between the slanted walls of the sections and the units center themselves in the sections. While the sides of the central wall 40a are diagrammatically shown in contact with the adjacent upwardly slanted walls of the lower mold section, it will be understood that the clearance between these parts is such that they do not come into engagement until the centering of the units is accomplished.

While the mold chosen for illustrating the invention is a book mold type, it is to be understood that the principles of the invention and in particular the concept of using inclined walls in the mold to support the articles being incapsulated, are applicable to production molds of the type in which an integral upper plate bridge is used that remains in the press when the press is opened and the lower mold section remains attached to the lower platen of the press.

From the foregoing description it will be evident that the mold of the present invention makes possible the simultaneous encapsulation of a great many leadframes in a minimum amount of space. For example, a mold that is about ten inches square (FIG. 4), can accommodate sixteen mold strips and, if each strip has fourteen leadframes, two-hundred twenty-four devices can be encapsulated in a single operation. Further, since the encapsulated strips rest on slanted support walls, they are readily removed when the upper mold section is moved away from the lower section—and no ejection pins or the like are necessary. A particularly advantageous feature of the present mold is the fact that, as the upper mold section is moved into engagement with the lower mold section, the slanted walls of the end bars 60 and 70 simultaneously engage the assembly 17 and center it relative to the bars 60 and 70. As a result, the assemblies 17, or families of assemblies, may be positioned in their operating positions during loading with less than 100% accuracy of longitudinal position as a consequence of the 10° angle at the ends of plates 86 and 87, and therefore the ends of the assemblies 17. This automatic centering action allows the practical use of automatic loading and unloading mechanization in positioning the assemblies 17.

The removal of an as-molded assembly of units with plastic runners attached and solidified can be done as a unit. The arrangement of runners to the "V" configuration of assemblies lends for ease in removing the runners from the molded strip/plate assemblies.

The method of plastic injection at the bottom of cavities due to the semi-vertical "V" configuration and resultant purging of trapped air up and away vertically through the vent system encourages higher quality transfer molding with less chance of trapping air bubbles along the length and interior of the molded part.

A further advantage of slanted wall molding is that the entrance of plastic into the cavity area via runners must proceed generally vertically and therefore gravity reduces the impact of the incoming plastic flow as it engages the delicate wire bonded connections from leadframe to chip. As a result, the possibilities of problems due to plastic gating spray against wire bonds is lessened.

Further, separation of a single molded strip, and two cavity plates is simpler and lends itself more to automation and cleaning than very large flat plates for many leadframe strips of the type in current production use.

We claim as our invention:

1. A mold comprising:
    (a) a lower mold section having spaced upwardly-projecting inclined planar walls defining a plurality of upwardly-opening longitudinally-extending recesses, said walls providing respectively article holder inclined planar engaging surfaces on which article holders are disposed respectively in inclined planes, said lower wall mold section comprising means disposed between each confronting pair of inclined planar article holder engaging surfaces for supporting at least one article holder;
    (b) an upper mold section having a plurality of downwardly-directed longitudinal walls adapted to be moved into the recesses of said lower section in interdigitating relation and cooperating with the walls of said recesses to define a plurality of longitudinal runners; and
    (c) means defining an inlet passage in said upper mold section, and means providing flow communication between said inlet passage and said longitudinal runners.

2. The mold of claim 1 wherein the walls of said mold section are slanted and said mold further comprising means for positioning each depending wall of said upper section in spaced relation to an upwardly-projecting wall of said lower section to define receiving chambers for article holders communicating with said runners.

3. The mold of claim 1 further comprising means defining vents at substantially right angles to said longitudinal runners and communicating therewith to carry trapped air away from said longitudinal runners.

4. The mold of claim 1 wherein said inlet passage includes one of said longitudinal runners, means defining a sprue hole extending downwardly through said upper mold section and communicating with said one longitudinal runner, and wall means defining a passage transverse to said longitudinal runners and establishing flow communication between said one longitudinal runner and each of the other of said longitudinal runners.

5. The mold of claim 1 wherein said means providing flow communication between said inlet passage and said longitudinal runners includes a wall at each end of said longitudinal runners disposed transversely to said runners and spaced from the ends of the walls defining said runners.

6. The mold of claim 1 wherein said longitudinal runners include an intermediate runner and a group of runners on each side of and generally parallel to said intermediate runner, and wherein said means providing flow communication between said inlet passage and said longitudinal runners includes said intermediate runner, a first transverse wall cooperating with the end walls defining one group of said runners to form a first transverse runner, and a second transverse wall cooperating with the opposite ends of the walls defining the other group of side runners whereby one group of side runners receives molten material from one end while the other group of side runners receives molten material from the opposite end.

7. An encapsulation mold comprising:
a first mold section having a plurality of spaced recesses defined by generally V-shaped walls, said walls providing respectively inclined planar article holder engaging surfaces along which article holders are disposed respectively, said first mold section comprising means disposed between V-shaped walls respectively for supporting at least one article holder;
a second mold section;
means on said second section defining projections arranged to extend into said recesses;
means in said second section defining an inlet passage for flowable encapsulation material; and
cooperating means on said sections for spacing the walls of the projections of said second section from the walls defining said recesses in said first section to provide chambers for articles to be encapsulated and to provide flow passages communicating with said inlet passage.

8. The mold of claim 7 wherein the projections of said second section are generally V-shaped and are arranged to be moved into interdigitating relation with said recesses of said first mold section to provide said chambers and said flow passages.

9. The mold of claim 8 wherein the apex of each of said V-shaped projections is flat and the base of each recess is generally flat, the base of each recess being spaced from a flat apex of one of said projections and cooperating therewith to define a flow passage.

10. The mold of claim 7 wherein each chamber communicates with one of said flow passages.

11. The mold of claim 7 further including means for venting said flow passages to atmosphere at a point remote from the point of communication of said passages with said inlet passage.

12. In combination, a base mold section, said base mold section being formed with multi-planar slanted walls on which article holders are respectively disposed in slanted planes, said base mold section comprising means disposed between respective confronting multi-planar slanted walls on which article holders are disposed for supporting at least one article holder, an upper mold section adapted to be moved to a position above and in closely spaced relation with said base section, means on said upper mold section providing walls disposed in spaced relation to multi-planar slanted walls of said base section to define receiving chambers for article holders and flow passages communicating with said chambers, the walls of said upper molded section that define said chambers being slanted whereby an article holder in one of said chambers can be quickly lifted out of its resting place when said upper section is moved away from said base section.

13. The combination of claim 12 wherein at least one of said article holders includes a pair of cavity plates adapted for holding an elongate strip of lead frame members therebetween to be disposed on a multi-planar slanted wall of said base section and arranged to be positioned in one of said receiving chambers for article holders.

14. A mold comprising:
(a) a lower mold section formed with multi-planar slanted walls on which article holders are respectively supported in slanted planes; and
(b) an upper mold section adapted to be moved to a position above and in closely spaced relation with said lower mold section, walls on said upper mold section disposed in spaced relation with said multi-planar slanted walls of said lower mold section to define receiving chambers for article holders and flow passages communicating with said chambers.

15. A mold as claimed in claim 14 wherein at least one of said article holders includes cavity plates holding a lead frame strip therebetween disposed on a multi-planar slanted wall of said lower mold section and arranged to be disposed in one of said receiving chambers for article holders.

16. A mold as claimed in claim 14 wherein said upper mold section is formed with multi-planar slanted walls adapted for interdigitating relation with said multi-planar slanted walls of said lower mold section.

* * * * *